Aug. 24, 1965 J. D. WATTS ETAL 3,202,216
SUBMERGIBLE APPARATUS FOR UNDERWATER OPERATIONS
Filed Jan. 9, 1959 8 Sheets-Sheet 3

INVENTORS
JOHN D. WATTS
JOHN SLACK
BY Cushman, Darby & Cushman
ATTORNEYS

Aug. 24, 1965  J. D. WATTS ETAL  3,202,216
SUBMERGIBLE APPARATUS FOR UNDERWATER OPERATIONS
Filed Jan. 9, 1959  8 Sheets-Sheet 4

INVENTORS
JOHN D. WATTS
JOHN SLACK

BY Cushman, Darby & Cushman
ATTORNEYS

INVENTORS
JOHN D. WATTS
JOHN SLACK
BY Cushman, Darby & Cushman
ATTORNEYS Aug. 24, 1965   J. D. WATTS ETAL   3,202,216
SUBMERGIBLE APPARATUS FOR UNDERWATER OPERATIONS
Filed Jan. 9, 1959   8 Sheets-Sheet 7

INVENTORS
JOHN D. WATTS
JOHN SLACK
BY Cushman, Darby & Cushman
ATTORNEYS

United States Patent Office 3,202,216
Patented Aug. 24, 1965

3,202,216
SUBMERGIBLE APPARATUS FOR UNDER-
WATER OPERATIONS
John D. Watts and John Slack, Houston, Tex., assignors
to Gray Tool Company, Houston, Tex., a corporation
of Texas
Filed Jan. 9, 1959, Ser. No. 785,984
18 Claims. (Cl. 166—46)

This application is a continuation-in-part of Serial No. 665,373, filed June 13, 1957, now abandoned. This invention relates to offshore oil well drilling operations and particularly to apparatus, procedures and techniques for use in such operations. The invention also relates to structures and methods for effecting water-tight joints and particularly adapted to connect submerged structures in offshore drilling operations.

Numerous apparatus, techniques and structures have been devised and used for exploiting oil deposits found under bodies of water, such as oceans, gulfs, rivers, etc. Such apparatus and techniques, for the most part, are extremely cumbersome, complicated, and expensive, involving time-consuming and tedious operations during installation and subsequent removal of the equipment.

It is customary in conventional offshore operations to utilize what will hereinafter be sometimes designated a "drive pipe." This pipe is quite large in diameter and is driven into the marine bottom at the desired site. Thereafter, the usual drilling operations are performed through the drive pipe which is usually left in the marine bottom after the well is completed. If the well head parts and completion equipment are disposed underwater adjacent the marine bottom, numerous problems are presented in the attachment of such parts and equipment. Suggestions have been made to develop submerged housings or chambers located above the drive pipe and adapted to accommodate men and equipment at the desired underwater level for permitting some of these operations to be performed. However, for one reason or another, such attempts have not been satisfactory.

Accordingly, it is an important object of the invention to provide a novel apparatus and method particularly adapted to facilitate offshore oil well drilling and completing operations and the like.

It is another object of the invention to provide a novel arrangement including a housing or water cellar for workmen adapted to be conveniently mounted underwater, in water-tight condition, on the submerged drive pipe of an offshore drilling apparatus, and also adapted to be conveniently removed from said pipe and also reconnected thereto, if desired. In this connection, it is proposed by this invention that means be provided whereby the water cellar may be lowered into water-tight position on the drive pipe and be removed therefrom or reinstalled thereon without requiring that any workmen, divers or the like be located underwater during such operation. Further in this connection, it is also proposed that the completed submerged well head assembly mounted adjacent the top of the drive pipe and other structures such as a protective cover or casing for the well head assembly be of such size in transverse or horizontal dimension in relation to other parts of the equipment that the housing or water cellar may be conveniently stripped up over the well head assembly after the latter is completed, or it may be conveniently reinstalled thereover and in sealing engagement with the drive pipe arrangement for any reworking of the well or other operations, as desired.

A further object is to provide a novel mounting means in combination with a submerged, non-buoyant housing arrangement and a drive pipe of the drilling apparatus, whereby the tendency of the non-buoyant housing to sink may be utilized to retain the housing in stationary, supported position on the drive pipe. A related object resides in the association of a novel fluid sealing arrangement with the aforesaid mounting means and adapted to effect the necessary water-tight or leak-proof seal in the mounting joint as a result of this tendency of the submerged housing to sink.

A still further object resides in the provision of a novel offshore drilling apparatus including a conveyor means or the like associated with a submerged housing and drive pipe, to facilitate transfer of men and equipment between the submerged housing and the surface of the surrounding body of water.

Among other and more specific objects of the invention are: the provision of novel drive pipe and housing structures suitable for use in offshore oil well drilling and completing operations and having mutually engageable tapering surfaces; and the provision of a novel water-tight joint for connecting a submerged housing and a submerged tubular member or like structures.

Further objects and advantages of the invention will be in part obvious and in part pointed out hereinafter.

The novel features of the invention may best be made clear from the following description and accompanying drawings in which.

Figure 1:
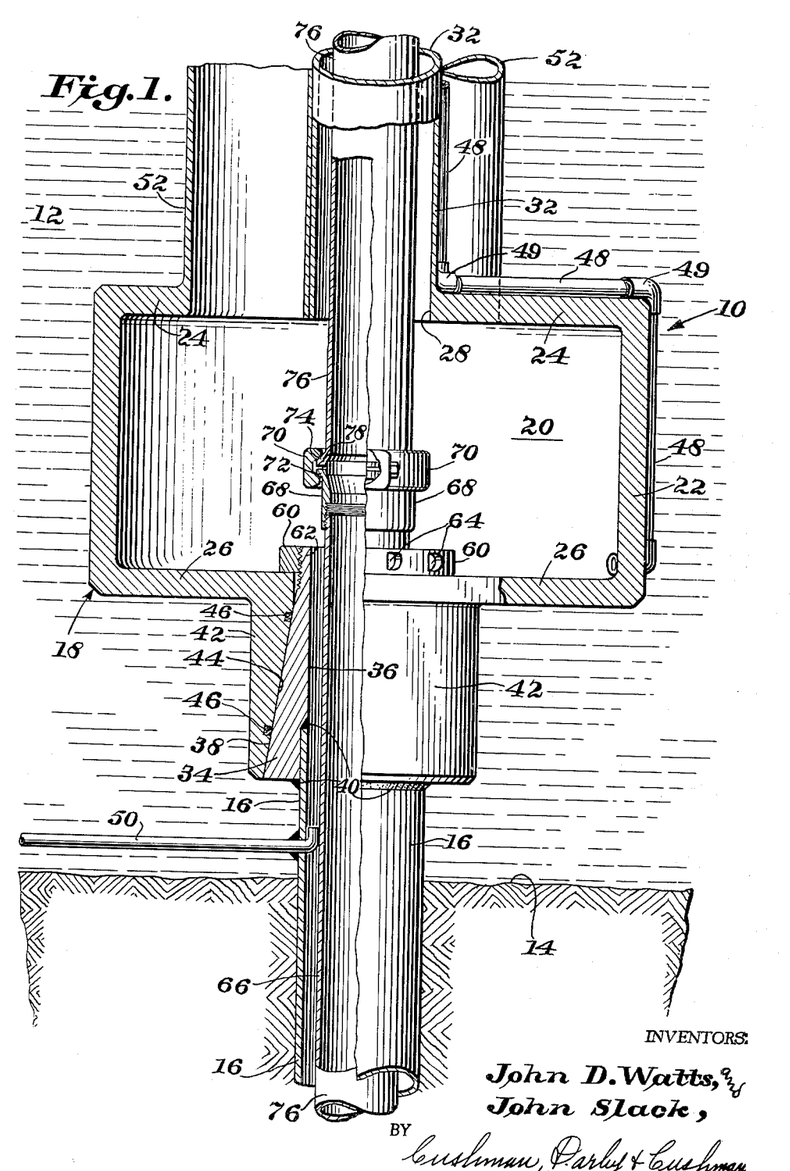
FIGURE 1 is a fragmentary vertical sectional view of an apparatus of the invention taken generally along line 1—1 of FIGURE 2 and shown in operative position.
Figure 3:
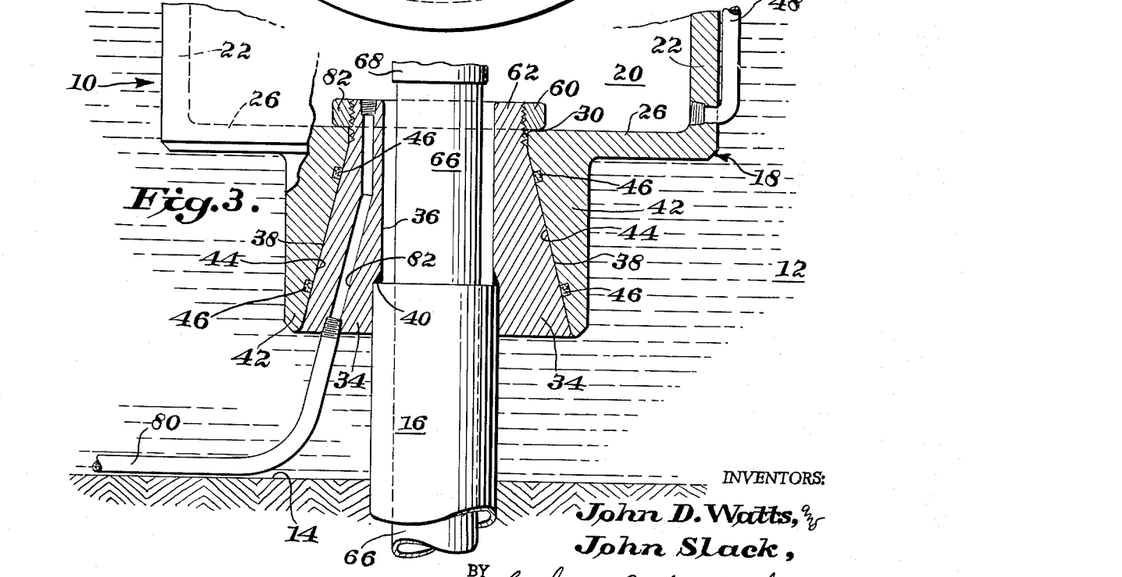
FIGURE 3 is a fragmentary vertical sectional view taken generally along line 3—3 of FIGURE 2, and with certain parts thereof enlarged and somewhat out of proportion for the purpose of clarity of illustration.

Referring now to the drawings, 10 designates an apparatus constituting one embodiment of the invention and shown in FIGURES 1 and 3 in operative submerged position with respect to the body of water 12 and marine bottom 14. It will be understood that this apparatus may be transported to the desired marine site by any conventional means, such as barges, and as seen in this embodiment, it includes a drive pipe 16 and housing 18.

The drive pipe 16 extends downwardly into the marine bottom 14, as is conventional, and is shown as terminating in an upper end disposed slightly above the marine bottom. The precise disposition of the upper end of the drive pipe may be varied according to the depth of the water, the nature of the marine bottom, or other conditions or circumstances, as will be evident. The fact that it is not necessary for the upper end of the drive pipe 16 to be located at the ocean floor is therefore most advantageous in providing for flexibility of installation, as will be understood. Subsequent drilling operations take place through this pipe.

Figure 2:
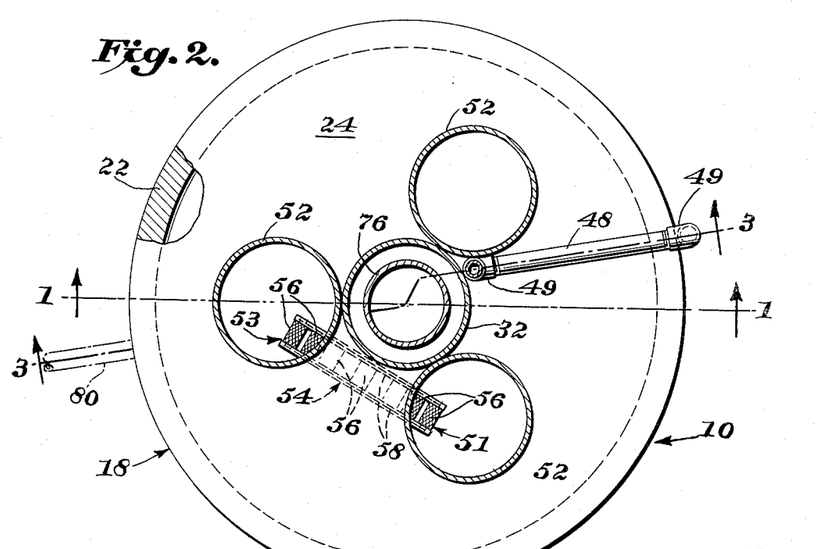
FIGURE 2 is a partially cut away top plan view of the apparatus of FIGURE 1 with some of the parts thereof shown in horizontal section.

The housing 18 is of any suitable shape, such as the circularly cylindrical shape shown in FIGURE 2, to define a relatively large chamber 20 therein adapted to receive and accommodate workmen and equipment. As shown, the housing includes side 22, top 24 and bottom 26 walls with coaxial openings 28, 30, respectively arranged in the top 24 and bottom 26 walls.

The invention contemplates the provision of novel means enabling housing 18 to be conveniently releasably mounted on the drive pipe 16 in water-tight relation therewith and supported thereby. In the illustrative embodiment of FIGURES 1-3, this means is shown as including a fitting 34 on the upper end of pipe 16 and an annular flange 42 depending from the housing bottom wall 26 and surrounding opening 30 therein. The housing 18, in this embodiment, preferably is of such weight and construction that it will sink in water, i.e., it is non-buoyant in water whereby it will have a tendency to readily sink in the body of water 12, and the fitting 34 and flange 42 are so constructed that this tendency of the housing to sink is utilized to hold them in engaged position. Preferably, the housing 18 is of integral metallic construction and a central conduit 32 extends upwardly from the opening 28 in the top wall 24 thereof, as shown in FIGURE 1, conduit 32 being open at its upper and lower ends and of a sufficient length to extend above the surface of the body of water 12 when the housing is disposed in operative submerged position.

The fitting 34 is shown as including an internal bore 36 of the same diameter as the internal diameter of pipe 16, and is formed with a tapering external surface 38. The lower portion of bore 36 may be counterbored as seen in FIGURE 1 to receive the upper end of the pipe 16 for suitable water-tight connection thereto as by welds 40, with the bore 36 flush with the inner surface of the pipe 16. Surface 38 preferably is frusto-conical, tapering downwardly and outwardly for engagement to a complementary internal tapered surface 44 on the flange 42.

In the installation or assembly of the housing 18 and drive pipe 16, the drive pipe with the fitting 34 thereon is driven into bottom 14 to the desired depth by any conventional means, such as a temporary driving connection (not shown) inserted into the top of fitting 34. Then the housing 18, with bottom opening 30 uncovered, is lowered down into the water and guided by suitable means such as guiding lines (not shown in FIGURES 1-3) extending upwardly from pipe 16 so that the tapering surface 44 of flange 42 slides over the fitting 34. Due to the non-buoyancy or weight of the housing 18, this lowering operation through the body of water is readily effected and the resultant downward force produced by the heavy housing 18, when submerged, insures firm seating contact of surface 44 of flange 42 on surface 38 of fitting 34. If desired, ballast tanks or compartments (not shown) may be provided in chamber 20, for example, and connected to suitable valves and pumping equipment for filling or emptying such tanks whereby the weight of the housing 18 may be controlled to control the step of lowering the housing and also to maintain a sufficient downward force on fitting 34 by the housing for proper fluid sealing action in the joint therebetween, as will be more apparent as the description proceeds. At this time, the conduit 32 is coaxial with pipe 16 and the housing is held against lateral and further downward movement by the engaged and mating tapering surfaces 38, 44.

Since it is desired to have workmen stationed in chamber 20 of housing 18 for performing such operations as the usual casing setting operations and the subsequent attachment of wellhead parts and completion equipment, it is necessary for the chamber 20 to be water-tight and emptied of all water therein. To assure water-tightness, the invention contemplates the provision of means for automatically sealing the joint between fitting 34 and flange 42 when the tapering surfaces thereof are brought into mutual engagement. Such means, in the illustrative embodiment of FIGURES 1-3, is shown as comprising sealing rings 46 constructed of suitable material for this purpose and disposed in annular recesses in the tapered surface 44 of flange 42, as shown in FIGURES 1 and 3. These rings are of such thickness that they normally project radially inwardly from surface 44 whereby they will be desirably compressed into full annular sealing contact with both surfaces 38 and their associated recesses by the downward resultant gravity force exerted by the housing 18 as a result of its non-buoyancy in water, and/or the ballast provided by water in the ballast tanks referred to. Thus, it will be appreciated that the tendency of the submerged housing to sink is utilized in connection with mounting and retaining the housing in a stationary and water-tight position on the drive pipe 16. It will be evident that only one or more than two of rings 46 may be employed, or they may be suitably mounted in recesses in the surface 38 of fitting 34 instead of as shown.

With the non-buoyancy of the submerged housing 18 insuring the effectiveness of the seals 46, the chamber 20 may now be emptied of water, such as by pumping through fluid line 48 suitably connected to housing 18 and opening into chamber 20 through side wall 22, as seen in FIGURES 1 and 3. Line 48 extends to the water surface and may be externally arranged adjacent the housing side wall 22, top wall 24 and conduit 32 by means of elbow joints 49, as shown. Suitable pumping means (not shown) are provided, for example at the top of line 48, for pumping the water out of chamber 20 and upwardly through line 48. Another emptying line 50 (FIGURE 1) may be provided opening into the drive pipe 16 is shown, and also extending to the surface for pumping the water out of the drive pipe by suitable pumping means (not shown) associated therewith.

After the submerged chamber has been rendered water-tight and emptied of water, men and equipment may now for the first time be lowered thereinto and raised therefrom. This is preferably done by arranging additional conduits 52 (see FIGURES 1, 2) on the housing 18 of a sufficient size to permit passage of men and equipment. These conduits 52 may be three in number, as shown, and arranged in parallelism with conduit 32, opening into chamber 20 at their lower ends and extending upwardly to open upper ends above the surface of the water. Although conduits 52 are indicated in FIGURES 1 and 2 as abutting conduit 32, in actual practice some lateral spacing is provided between conduits 52 and 32 whereby the lateral pressure of the water thereon will be minimized. Conduits 52, as well as conduit 32, may be integral or otherwise sealingly joined to the housing top wall 24. To facilitate the lowering and raising operations for men and equipment through the conduits, a conveyor 54 is shown in FIGURE 2 associated with two of the conduits 52. This conveyor may be of any suitable construction with interconnected vertical flights 51, 53 extending through the two conduits 52, as indicated. As is evident, flights 51 and 53 move in opposite vertical directions and the conveyor structure may be of the type currently found is some commercial parking lots, having spaced rungs or foot rests 56 carried between endless belts or link chains 58 suitably looped or passing through the two conduits 52.

The driving and mounting means for the conveyor 54 are not shown, but may be of any suitable construction, disposing and moving the conveyor flights in the manner disclosed. The conveyor may be continuous in operation, thereby functioning as an elevator wherein men will step on a rising or descending rung 56 (depending on whether they are in chamber 20 or at the water surface) and then be carried through the conduit 52. Likewise, control equipment or parts thereof or other equipment may be mounted on the rungs 56 and carried thereby between the surface of the water and chamber 20.

If desired, the conveyor means 54 may be omitted and ladders (not shown) in FIGURES 1–3 of any suitable design may be arranged in the conduits.

To provide additional protection against leakage through the submerged joint between fitting 34 and flange 42 and to prevent relative motion of the tapered surfaces due to vibration, etc., the upper end 62 of fitting 34 may be externally threaded and project into the chamber 20, as shown in FIGURES 1 and 3, for threaded connection to a locking nut or ring 60. This ring 60 includes any suitable means facilitating turning thereof, such as circumferentially spaced lugs 64 adapted to be engaged by the workmen or suitable tools. Threaded connection of ring 60 on the fitting 34 may be effected by the first men lowered into the chamber, and the ring 60 is of a sufficient diameter to be tightened against the inner surface of the of the bottom wall 26 thereby increasing the contact and sealing pressures for the engaged tapered surfaces 38, 44 and seals 46. As indicated hereinabove, the downward force exerted by the housing 18 on fitting 34 is sufficient, by itself, to effect fluid-tight sealing engagement between seals 46 and surfaces 38, 44 so that there will be no danger of leakage when the first men are lowered into the submerged chamber 20, after it has been emptied of water. Ring 60 may be suitably carried in the housing 18 as the housing is being lowered onto the drive pile, or it may be lowered on the conveyor 54 after the housing is mounted on the drive pile.

With the apparatus 10 assembled and installed underwater, as described above and shown in FIGURES 1 and 3, the casing setting and well drilling and completing operations can now be performed in the usual manner. It is preferred that the rotary table, draw works, Kelly joint, tongs, derrick, etc. (not shown), conventionally utilized in well drilling operations, be disposed above the water surface and arranged, for example, on a drilling platform or an adequately anchored floating vessel. These drilling devices form no part of the present invention and may be of any suitable construction.

The first string of casing within the drive pile is indicated by numeral 66, having been arranged and set in a drilled hole within pipe 16 in any suitable manner. During the drilling operation for forming this hole for casing 66, return fluid may be received by the temporary line 50 and a suitable mud diverter (not shown) would be arranged at the upper end of the drive pipe. The first head on casing 66 is indicated by numeral 68 and as will be understood, control equipment will be mounted above the casing head 68 in chamber 20 or above tubular extension member 76 above the water surface, if preferred, and including, for example, a master drilling valve and a blow-out preventer (not shown) which preferably are of the type referred to in Patent No. 2,766,829.

If the control equipment is to be utilized above casing head 68 in chamber 20, it may be intially disposed in the chamber 20 before the latter is submerged and lowered onto pipe 16, or such equipment may be carried by conveyor 54 down to chamber 20 after the housing 18 has been submerged into operative position. The control equipment will be connected for operation in the usual manner and by following conventional practices, such as described in Patent No. 2,766,829, and in this regard, connections of the type disclosed in Patent Nos. 2,766,829, 2,766,998, 2,766,999 preferably are utilized, inasmuch as it is very important that a connection that will not loosen under drilling conditions be used. The "Grayloc" connections of these patents are superior in this respect. This fact alone would be sufficient to eliminate the need of a blowout preventer below the water surface. As will be appreciated, if a connection leaked down in the housing or water cellar 18 and blow-out preventers were only located at the water surface, a disaster could result.

FIGURE 1 illustrates a preferred connection, being of the type disclosed in Patent No. 2,766,829, and comprising: a clamp 70 for flange 72 on casing head 68 and flange 74 on the tubular extension member 76; and a sealing ring 78 frictionally engaged to flaring internal surfaces on the head 68 and member 76. For the purpose of this description, tubular extension 76 may be considered to represent schematically all of the usual control equipment. Line 48 may be temporarily connected to the casing head, control equipment or auxiliary equipment outlets, as may be desired or required during the various operations.

After the well has been drilled and an additional string or strings of casing (not shown) run and landed, workmen in the chamber 20 will remove the control equipment or they will disconnect the lower end of extension 76 if the control equipment is arranged above the water surface, and then suitable completion or Christmas tree flow control equipment will be attached, such as described, for example, in Patent No. 2,766,829. A permanent line 80 (FIGURE 3) is provided for suitable connection with the well head assembly to convey the oil which is produced to a suitable storage point. This line 80 preferably is suitably connected in fluid-tight relation to fitting 34. As shown, line 80 communicates with a bore 82 in the fitting whereby the workmen in chamber 20 may conveniently connect the upper end of bore 82, which may be internally threaded, as shown, to the completion or Christmas tree flow control equipment in any suitable manner. Permanent line 80, in the illustrated embodiment, will be attached to fitting 34 before the upper end of pipe 16 is submerged and driven into the marine bottom.

The invention contemplates that the completed well head assembly comprising the completion equipment and the permanent flow lines located above fitting 34 will be of a maximum diameter or horizontal dimension sufficiently smaller than the minimum diameter of the openings 30 and 44 at the bottom of housing 18 to present no interference to subsequent upward removal or stripping of housing 18 from the drive pipe fitting 34 over such completion equipment.

When the well has been completed, the control and/or other equipment not permanently connected to the well head and which may have been located within chamber 20 may be carried to the surface through conduit 32, or by conveyor 54, or such may be secured somewhere in housing 18. A buoy anchor line (not shown) preferably is then connected to the permanent underwater structure of the well head assembly and extends up through one of the conduits 32, 52. The workmen then remove ring 60 from the projecting end 62 of fitting 34 and return to the surface. The non-buoyancy of the housing 18 insures necessary sealing pressures for seals 46 when the ring 60 is removed. The housing 18 is then raised through the water by suitable means (not shown). The opening 30 in the housing bottom wall 26 will be of a sufficient size to pass freely over the completion equipment on the well head, as indicated heretofore. The elevated housing 18 is then ready to be moved to a new location with the rest of the drilling equipment. The buoy anchor line extends to a surface buoy to mark the well location and also to act as a guide if reinstallation of housing 18 should be desired or necessary. In this connection, it will be evident that the housing 18 may be readily reconnected to the drive pipe fitting 34 in the same manner as that previously described for initial installation thereof.

An important advantage of the invention is that the novel construction of the pipe 16 and housing 18 enables the housing to be mounted in fluidtight relation underwater on the pipe by a simple and expeditious procedure whereby the apparatus is eminently suitable for use in offshore oil well drilling operations. Another advantage is that the water-tightness of the submerged housing allows and facilitates close manual underwater installation and operation of the wellhead, and control and completion equipment.

Moreover, as previously indicated, the top of the submerged drive pipe 16 need not be positioned at any particular height relative to the marine bottom 14 since the housing 18 will be adequately supported on the fitting 34 whether the latter is on the marine bottom or disposed thereabove, such as is indicated in FIGURES 1 and 3. This is of considerable importance, for example, where the water is excessively deep, since it will not be necessary to mount the housing 18 on the marine bottom which among other things, would require conduits 32, 52 to be of considerable length. Furthermore, direct support of the housing on the marine bottom may be undesirable particularly when the latter is too soft and muddy to provide proper support and stability.

FIGURES 4–9 illustrate in more detail, steps involved in the mounting of the drive pipe and housing in the production of the off-shore underwater oil well, according to an embodiment of the invention. The drive pipe and water cellar or housing arrangement shown in these figures are modifications of the corresponding structures illustrated in FIGURES 1–3, and similar reference numerals have been used to designate similar parts.

Figures 4, 5, 10:
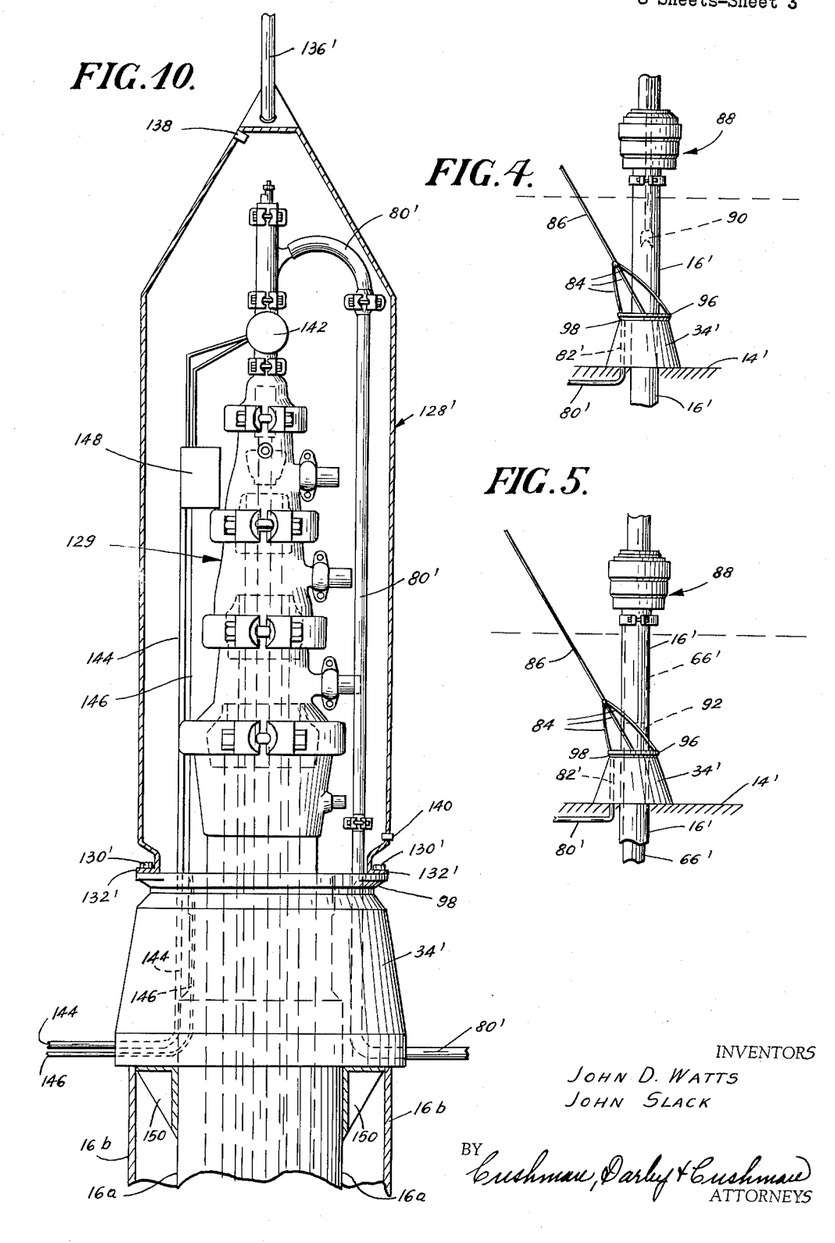
FIGURES 4–9 illustrate, sequentially, some of the steps involved in an exemplary method for performing off-shore operations, of the type referred to, with exemplary structures.
FIGURE 10 is an enlarged and partially vertically sectioned view of a completed, submerged well head assembly of the invention.

FIGURE 4 illustrates the drive pipe 16' as being driven into the marine bottom 14' to the point where the water cellar base or fitting 34' rests on the marine bottom, although this fitting may be disposed thereabove at any desired location, as stated heretofore. The drive pipe 16' is shown as extending upwardly through the fitting 34' and to the water surface. In this arrangement, the fitting 34' with the permanent line 80' attached thereto is securely connected to the drive pipe 16' before the latter is driven into the marine bottom. This may be done by welding the fitting and the drive pipe together, at the upper and lower ends of the fitting 34' to provide fluid-tight weld seams surrounding the drive pipe 16'.

Guide lines 84 are shown attached to the top of the fitting 34' and join to a buoy line 86 extending to the water surface.

It will be understood that suitable means will be used for sinking the drive pipe. For example, a conventional off-shore marine platform (not shown) may be constructed above the prospective well site, provided with tools and machinery for driving the drive pipe and for performing other operations in the production of the well.

After the drive pipe has been arranged in the submerged position thereof, shown in FIGURE 4, control equipment generally indicated by numeral 88 and of any suitable construction is mounted on the drive pipe above the water surface, and a drilling tool 90, of conventional design, may then be inserted therethrough and through the drive pipe for drilling into the marine bottom in the usual manner.

After the hole is drilled, the first string of casing 66' is shown in FIGURE 5 as being run through the drive pipe 16' and the usual cementing operations may then be performed. The casing 66' is shown as being provided with a collar 92 spotted just above the fitting 34', as indicated in FIGURE 5. This collar will be of any suitable construction providing a detachable joint.

Figures 6, 7:
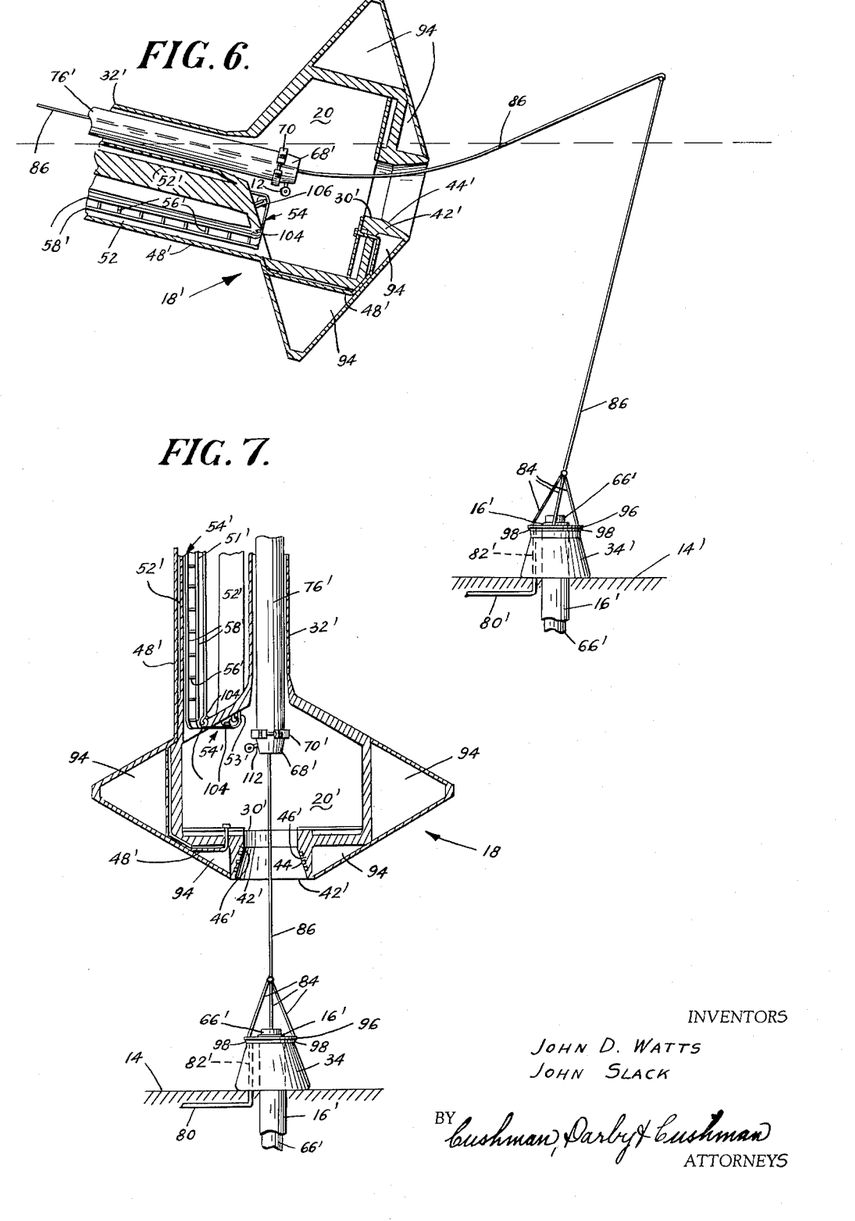

The casing collar 92 may now be backed off to remove the top part of the casing 66', and as indicated in FIGURE 6, the drive pipe 16' will be cut off above the fitting 34'. Any appropriate means, such as a cutting torch, may be utilized for severing or removing the top part of the drive pipe 16', as should be understood.

The water cellar or housing arrangement 18' shown in FIGURES 6–9 includes ballast tanks 94. Control means are provided for the ballast tanks, such as will be described in more detail in connection with FIGURE 12, whereby the buoyancy of the water cellar may be controlled. The water cellar will initially be buoyant so that it may be floated in the body of water for convenient delivery to the marine site, such as by being towed by a tug boat or the like.

The buoy line 86 is then strung through the center conduit 32' of the water cellar, which may also initially carry the tubular extension 76' therein for the casing 66', the buoy line 86 extending through this extension 76', as indicated in FIGURE 6.

The control means for the ballast tanks are then operated to permit the introduction of water thereinto whereby the water cellar will be sunk toward the fitting 34' on the drive pipe. The buoy line 86 will be utilized to guide the water cellar in the proper path, in vertical alignment with the fitting 34' and drive pipe, as indicated in FIGURE 7. It might be noted that the buoy line 86 and guide lines 84 preferably are of strong and durable construction, such as thick metal cables.

As the water cellar 18' comes into position adjacent the fitting 34', the flaring internal surface 44' on the annular flange 42' will be properly fitted on the outer tapering surface of the fitting 34', as described heretofore in connection with FIGURES 1–3, with the water cellar thus being mounted on and supported by the fitting 34' of the drive pipe. The guide lines 84 will assist in guiding the flange 42' of the water cellar 18' into proper position on the fitting 34'. The sealing means 46' shown as being arranged in the surface 44' will make the joint water-tight, also as previously explained.

Figures 8, 9:
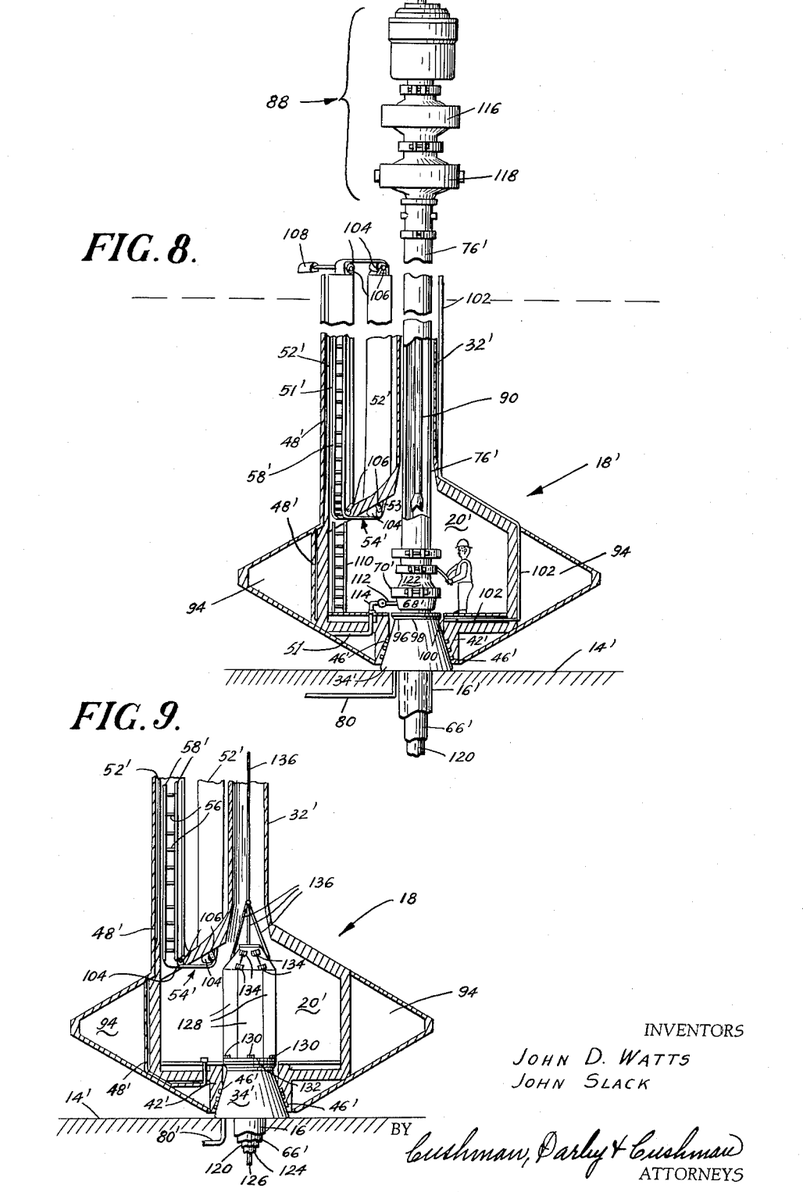

It is contemplated in the embodiment shown in FIGURE 8 that means, automatically actuable from a position at the water surface, be provided for releasably locking the flange 42' in sealing engagement to the fitting 34' before any workmen descend into the chamber 20' of the water cellar. In this embodiment, such means includes a circumferential flange 96 at the top of fitting 34' and having a downwardly and inwardly tapering shoulder 98. A reciprocable locking pin 100 is shown in FIGURE 8 as being mounted in the upper end of flange 42' for wedging engagement against this shoulder 98. The pin 100 is actuated remotely from the water surface. A hydraulic line 102 is connected to pin 100 and to a source of hydraulic pressure at the surface for regulation by controls (not shown) also located at the water surface. These structures and their operation for controlling the movement of the locking pin 100 between its extended locking position in engagement with the shoulder 98 and its retracted unlocked position may be of any appropirate design. A suitable arrangement will be described in more detail hereinbelow in connection with the embodiment shown in FIGURES 11 and 12. It should be evident that more than one pin 100 may be used, if desired.

After the water cellar has been lockingly engaged to the fitting in the manner just described, the water will be pumped from the chamber 20', such as through the conduit 48' by means of a suitable pump (not shown) arranged, for example, at the water surface.

Workmen may then safely enter the chamber 20' through the conduit 52'. As shown, a conveyor 54' is provided with a flight 51' extending down one conduit 52' and another flight 53' extending up the other conduit 52'. This conveyor includes longitudoinal elements 58' and transverse elements 56' and is shown as being trained around rollers 104 suitably journalled to brackets 106 connected at the ends of the conduits 52', as indicated. As will be evident, appropriate driving means may be provided for the conveyor. For example, a motor 108 (FIGURE 8) may be drivingly connected to one or more of the rollers 104 for this purpose.

In FIGURE 8, a ladder 110 is shown as extending between the bottom of the conveyor 54' and the floor of the chamber 20'.

After the workmen have entered the chamber 20', the extension 76' may then be engaged to the upper end of the casing 66' in any appropriate manner. The upper end of the casing 66' may be externally threaded for engagement to an internally threaded casing head 68' carried at the bottom of the extension 76', such as in the manner disclosed in the aforesaid Patent No. 2,766,829. The workmen may then connect the outlet 112 from casing head 68' to the line 51 by means of an elbow 114 or like fitting, as indicated in FIGURE 8.

Suitable control equipment 88 may then be arranged at the top of the extension 76', as shown in FIGURE 8, and including a blowout preventer 116 and master drilling valve 118 of conventional design such as the type referred to in Patent No. 2,766,829.

Further drilling may then take place through this control equipment, after which a second string of casing 120 will be run and cemented, in any appropriate manner.

A casing head spool 122 (FIGURE 8) of any known form may then be clamped to the casing head 68' and the production pipe 124 will then be run and cemented. Thereafter, the tubing head will be installed, and the tubing 126 landed. Conventional completion equipment, such as the Christmas tree construction disclosed in Patent No. 2,766,829, will be installed in the usual manner, and the well tested. This completion equipment, as well as other structures for the well head assembly, may be initially disposed in the chamber 20' by being inserted through flange 42' before the water cellar is submerged, or if desired, they may be conveyed down through the conduit 52' after the water cellar has been mounted in submerged position on the fitting 34'. In the latter regard, it will be evident that the diameters of the conduits 52' will have to be sufficient to provide for the passage therethrough of such equipment.

In the embodiment under consideration, it is contemplated that the Christmas tree or well head assembly be covered before removing the water cellar 18'. The permanent line 80' will be connected to the outlet valve of the Christmas tree and extend to any desirable gathering station. Although not shown, it will be appreciated that a control line may be provided extending from a remote control station to the outlet valve for the Christmas tree to regulate flow through the gathering line 80'. Other permanent lines may be arranged for connection to the completion equipment, as desired.

The Christmas tree cover is shown in FIGURE 9 as including a plurality of sections 128 suitably connected to the top of the fitting 34', as by bolts 130 bolted to the fitting and passing through a flange 132 at the bottom of sections 128. The sections 128 may be quarter sections and they may be lowered one at a time down through the conduit 32' by suitable means such as cables. They may be connected in the relation shown, for example, by connectors 134, so as to be water-tight or, if preferred, the cover need not provide a water-tight enclosure for the Christmas tree. These sections 128 preferably are tapered at their upper ends, as shown, for a purpose to become apparent as the description proceeds. As shown, buoy lines 136 extend from the cover sections 128 through the conduit 32' and to the surface.

After the well has thus been formed and completed, the locking pin or pins 100 will then be retracted and, with all workmen having evacuated the chamber 20', the ballast tanks 94 for the water cellar will then be filled with air to displace the water therefrom and cause the water cellar to rise or surface under its own buoyancy. The water cellar may then be reused at a different location or, if subsequently necessary, may be reinstalled over the already completed well in the same manner as that described for the initial installation thereof. A buoy (not shown) connected to the buoy line 136 and disposed at the water surface will mark the location of this well for any such subsequent reinstallation.

The sections 128, constituting a protective covering for the completion equipment, are of such design as not to project horizontally to a position where they might interfere with the raising or lowering of the flange 42' of water cellar 18' thereover. Preferably these sections are of rugged and robust construction, forming a cylindrical portion of smaller outer diameter than the smallest inner diameter of flange 42' and opening 30'. The frusto-conical upper end of these sections 128 will facilitate any reinstallation of the water cellar 18' in proper position on the fitting 34'.

FIGURE 10 shows a modification of the Christmas tree cover of FIGURE 9. The Christmas tree 129 shown in FIGURE 10 is of the type disclosed in Patent No. 2,766,829 and the cover 128' for Christmas tree 129 may be of integral, generally cylindrical construction with an annular flange 132' at its base for suitable detachable connection to fitting 34' as by bolts 130'. The cover 128' is water tight and a suitable O-ring seal (not shown) or the like may be provided between the flange 132' and the fitting 34' for this purpose. A check valve 138 is shown as being provided at the top of cover 128' and oil or a similar non-corrosive fluid preferably is injected therethrough to fill the cover 128'. A suitable drain valve 140 may be provided at the bottom of the cover 128'.

A conventional hydraulically operated, fail safe valve 142 is provided in the Christmas tree 129 to control flow through permanent flow line 80'. Electrical 144 and hydraulic 146 lines extend from a remote control point through fitting 34' to a control box 148 and to valve 142 to regulate the latter in any known manner.

FIGURE 10 shows an inner 16a and an outer 16b drive pipe with centering plates 150 welded to the bottom of fitting 34' and inner pipe 16a. The outer pipe 16b is for structural support only, if and when required, and may be welded to the fitting 34'.

Figures 11, 15:
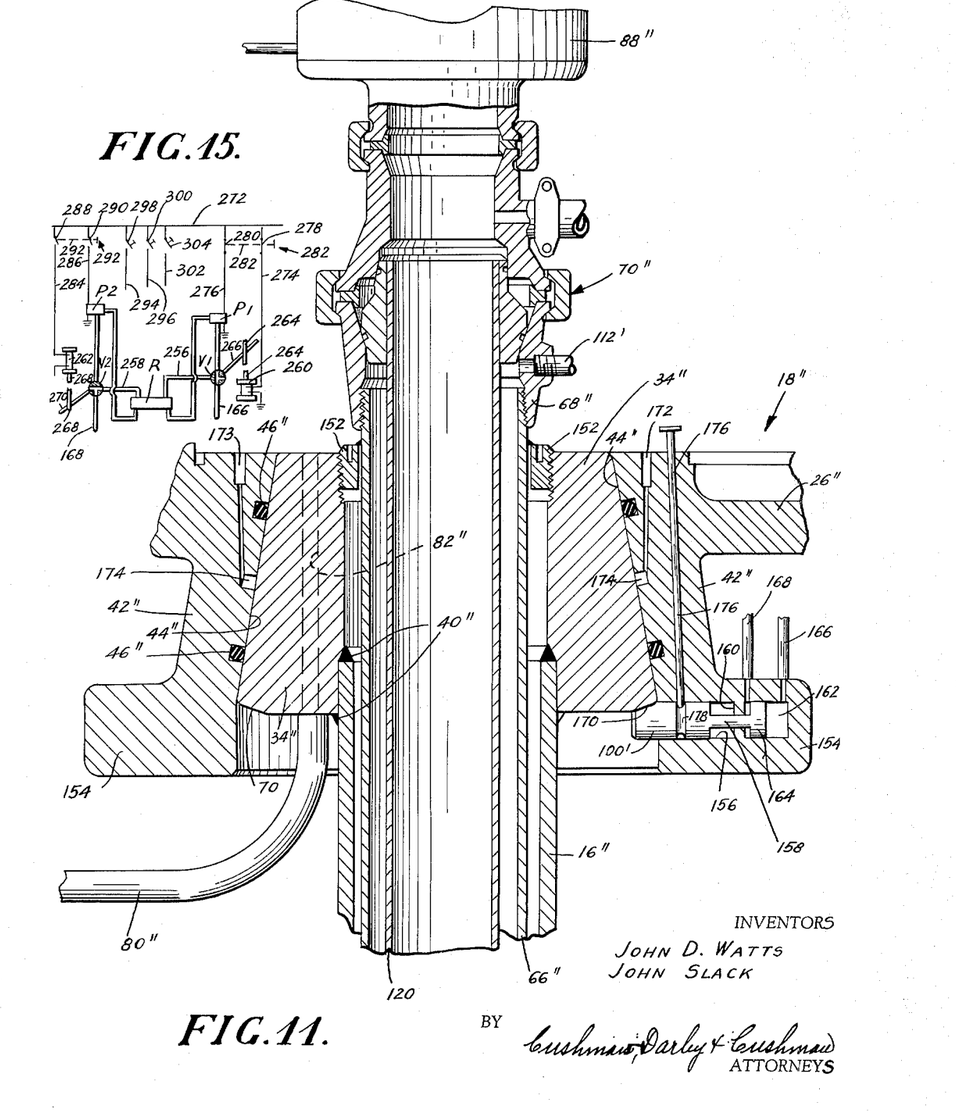
FIGURE 11 is a fragmentary and enlarged, vertical sectional view corresponding generally to FIGURE 3 and showing modifications.
FIGURE 15 is a diagrammatic showing of an exemplary control arrangement for use with the structures shown in FIGURES 11 and 12.
Figures 12, 13, 14:
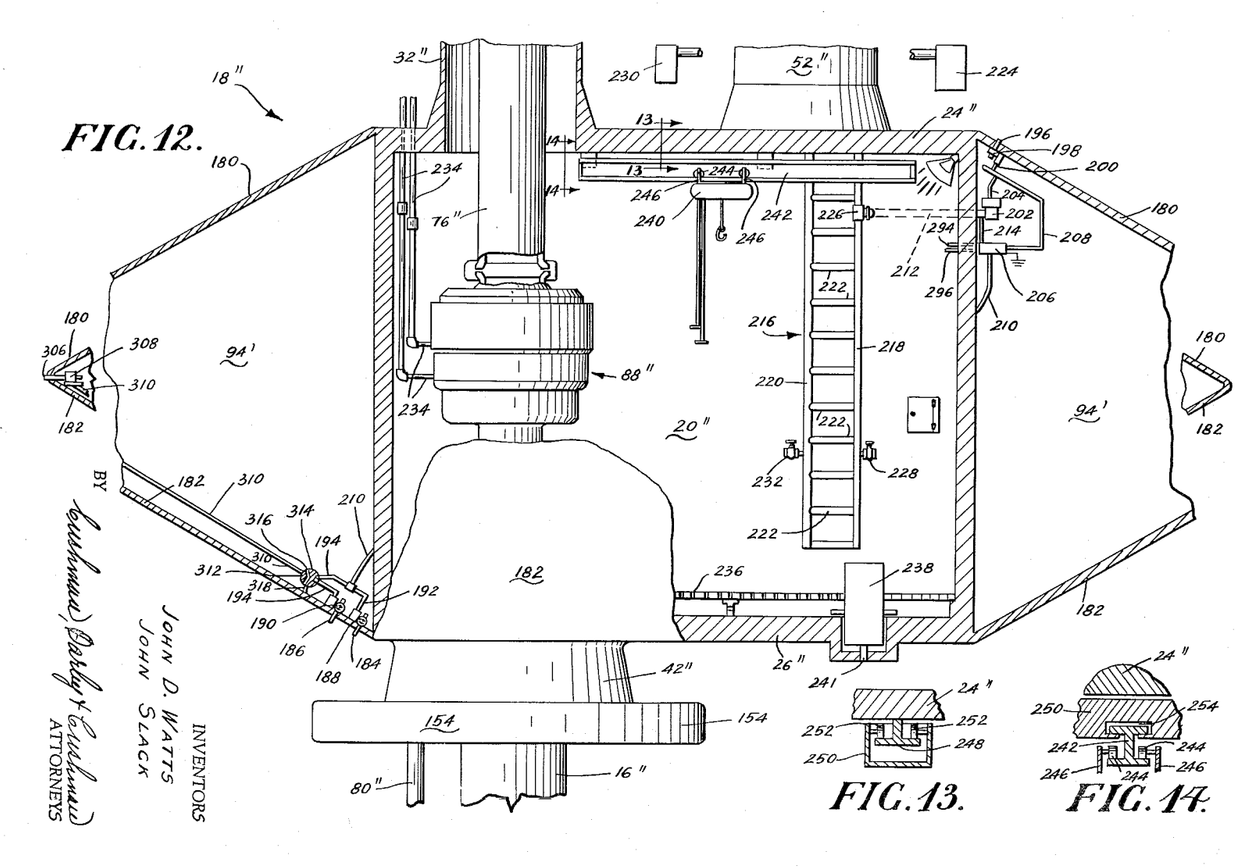
FIGURE 12 is a fragmentary and enlarged elevational view, partially vertically sectioned and partially cut away, of a modified water cellar or housing arrangement mounted on a submerged drive pipe, for example, by means of the structure shown in FIGURE 11.
FIGURE 13 is an enlarged and fragmentary sectional view taken generally along line 13—13 of FIGURE 12.
FIGURE 14 is an enlarged and fragmentary view taken generally in the direction of arrows 14—14 of FIGURE 12.

FIGURES 11 and 12 illustrate further modifications in the water cellar and drive pipe arrangement, and similar reference numerals have again been used to designate similar parts. As best seen in FIGURE 11, the fitting 34'' is welded to the top of the drive pipe 16'' in the places indicated by numerals 40''. The upper end of the fitting 34'' is shown as being internally threaded to receive a threaded locking ring 152. This ring is shown as being welded to the first string of casing 66'' to secure it in position.

Conventional casing head and other structures, as well as control equipment, are illustrated in FIGURE 11. Such structures and equipment may be of the type disclosed in Patent No. 2,766,829, as indicated heretofore.

The annular flange 42'', depending from the bottom wall 26'' of the water cellar 18'', is shown as including a radially outwardly directed lower lip or flange 154 adapted to extend below the bottom of the annular fitting 34'' when the water cellar is assembled thereon, as shown. A locking pin 100' is shown as being reciprocably mounted in a horizontal bore 156 in the flange 154, with a rod portion 158 extending through a dividing wall 160 into a chamber 162. A piston head 164 is carried by rod 158 for reciprocation in chamber 162, as is evident.

As shown, hydraulic lines 166, 168 are connected to the flange 154 and open into the chamber 162 on either side of the piston head 164. These hydraulic lines extend to a source of hydraulic pressure and controls therefor arranged at the water surface, for remote control of the positioning of the locking pin 100'. This pin will normally be in a retracted position so as not to interfere with the positioning of the flange 42″ on the fitting 34″. After the flange 42″ has been so positioned to mount the water cellar, the controls will be actuated to cause hydraulic pressure to enter into the chamber 162 through line 166 forcing the locking pin 100′ to the projected position thereof shown in FIGURE 11. An upwardly and outwardly tapering annular surface 170 preferably is formed at the lower end of the fitting 34″, as shown, for wedging action with a complementarily inclined surface on the locking pin.

It will be understood that the hydraulic line 168 may be omitted and a suitable spring means, such as a compression spring, arranged in the chamber 162 between the wall 160 and the left hand face of the piston head to continuously urge the locking pin 100′ to its retracted position. It will be further understood that additional locking pins similar to pin 100′ may be provided at other points along the internal surface of the flange 154 for locking engagement to the fitting 34″ at other points.

Conventional O-ring seals 46″ are shown in the flange 42″. Additionally, provision may be made for the injection of a packing material at the interface between the engaged fitting 34″ and flange 42″. For this purpose, a passageway 172 is provided in the flange 42″ opening at its lower end into an annular recess 174 formed in the surface 44″. And a suitable packing material may then be injected through the passageway 172 into the recess after the fitting and flange have been assembled, and in any appropriate manner, such as that disclosed in Patent No. 2,485,497. Although not shown, it will be understood that suitable check valves may be provided in the passageway 172 and in a venting passageway 173 communicating with the recess 174, in connection with the injection of such packing material, as disclosed in the patent just referred to.

A latch is shown in FIGURE 11 for engaging the locking pin 100′ to hold it in projected or locking position. This latch includes a vertical rod 176 slidably mounted in the flange 42″ for movement into a recess or notch 178 in the locking pin. The latch may be engaged in the recess 178 by the first man entering the chamber and will be released before the men leave the chamber so that the locking pin 100′ may be retracted for surfacing of the water cellar.

The water cellar 18″, as best seen in FIGURE 12, includes the cylindrical wall 22″ defining therein the working chamber 20″. A ballast tank 94′ is shown as being formed around the periphery of the wall 22″ by converging upper 180 and lower 182 walls.

The buoyancy of the water cellar 18″ will be controlled by means of the ballast tank 94′. The water cellar normally will be buoyant in a body of water when no water is in tank 94′, and it is contemplated that some appropriate automatic control system be provided for introducing water into the ballast tank or discharging water therefrom to regulate the buoyancy of the water cellar during installation or removal thereof relative to the submerged drive pipe. FIGURE 12 illustrates a water inlet 184 and a water outlet 186 in wall 182 and connected to conventional water pumps 188, 190 respectively. In this embodiment, these pumps will be actuated by compressed air flowing through lines 192, 194 to the pumps, as indicated.

An air outlet 196 is provided in the wall 180 with a normally closed valve 198 arranged in this outlet and adapted to be actuated by compressed air flowing through line 200, and in any conventional manner, as will be understood. A normally closed air inlet valve 202 is arranged within the ballast tank 94′ and is also adapted to be actuated by compressed air flowing in line 204, and in any conventional manner, as will be referred to again hereinbelow. A pressure regulator 206 is connected to a feed line 208 communicating with lines 200, 204 for delivering air to actuate the valves 198, 202.

Another feed line 210 extends from the pressure regulator 206 and branches into the lines 192, 194 for the air-actuated hydraulic pumps 188, 190, as shown.

A pipe 212 extends through the wall 22″ of the working chamber and opens at one end into the valve 202, and communicates at its other end with a source of fluid under pressure, as will be later described in more detail. A branch conduit 214 connects this pipe with the pressure regulator 206 whereby the pressurized fluid may be delivered to the feed lines 208, 210, depending upon the operation of the regulator, as will be referred to again in more detail hereinbelow.

In this embodiment, it is preferred that a ladder 216 be suitably arranged in the conduit 52″ extending upwardly therethrough to the surface. The ladder 216 comprises the vertical members 218, 220 and the usual rungs 222. However, the vertical member 218 is made hollow and communicates at its upper end with a source of fluid under pressure at the water surface and indicated schematically by numeral 224. Any suitable connections may be utilized to connect the vertical member 218 to the fluid pressure source 224, as will be understood. In this embodiment, the fluid under pressure is compressed air at a pressure of approximately 150 p.s.i. A T-fitting 226 is shown connecting the pipe 212 to the vertical member 218, and a suitable outlet valve 228 may be provided at the lower end of the vertical member 218, as shown.

The other vertical member 220 of the ladder may also be of hollow construction, communicating at its upper end with a source of water 230 at the water surface, and with a conventional outlet valve 232 attached thereto within the chamber 20″, as shown.

In FIGURE 12, the control equipment 88″ is shown as being arranged in the working chamber 20″, with the tubular extension 76″ extending up through the conduit 32″ to the surface. Part of this control equipment may be inserted through flange 42″ into the working chamber before the water cellar is submerged, and placed around a sump pump 238 when not in use. Other parts of the control equipment may be lowered into the submerged water cellar through conduit 52″, as required. It will be appreciated that some blowout preventers may be used on extension 76″ at the surface, in combination with a preventer mounted in the chamber 20″ at the base of extension 76″.

A floor 236, preferably in the form of conventional openwork metallic grating, is arranged above the bottom wall 26″ of the water cellar and supported in any appropriate manner, as shown. A sump pump, indicated schematically at 238, is provided in the bottom wall 26″, and may be of any conventional form including a conventional float arrangement for actuating the pump to discharge any water that may fall through the grating 236 during operations. This pump includes inlets (not shown) and an outlet 241. If desired, this pump may be utilized for removing all of the water from inside the chamber 20″ after the water cellar is initially mounted on the submerged fitting 34″.

Arranged at the top of chamber 20″ is an overhead hoist 240 (FIGURE 12). This hoist is shown as being mounted on an I-beam 242 by means of rollers 244 connected to the hoist by braces 246 fixed to the hoist 240, the rollers being arranged on the bottom flange of the I-beam, as indicated in FIGURES 12 and 14. The I-beam 242 preferably is mounted for rotation around a circular track. An exemplary construction in this regard includes a circular track 248 (FIGURE 13) depending from the top wall 24″, with a circular, generally channel-shaped member 250 of approximately the same diameter as track 248 disposed substantially coaxially therebelow and suitably mounted for rotation relative to the track, as by rollers 252 (FIGURE 13) spaced circumferentially along member 250 and engaging the flange of the track, as should be evident. The I-beam is supported by member 250, being suitably engaged thereto at diametrically opposite points. As shown in FIGURE 14, a slot 254 may be formed in member 250 for sliding engagement to the upper flange of I-beam 242. A similar slot will then be provided at a diametrically opposed point in member 250. Suitable stop means may be provided, e.g., at the ends of I-beam 242, for preventing accidental removal of the I-beam from the member 250.

FIGURE 15 illustrates schematically an exemplary arrangement for controlling operation of the locking or wedging pin 100′ and the valves and pumps for the water and air inlets and outlets in the ballast tank 94.′ It will be appreciated that this control arrangement is being shown and described for illustrative purposes only, inasmuch as other appropriate arrangements may be used, as desired.

Hydraulic lines 166, 168 are shown as leading from chamber 162 to conventional valves V1, V2 respectively. These valves in turn lead to hydraulic pumps P1, P2 which in turn communicate with a hydraulic reservoir R, as shown. Vent lines 256, 258 lead respectively from valves V1, V2 to the reservoir R as shown.

Solenoids 260, 262 are provided for actuating the valves, the former having a reciprocable armature 264 suitably connected to a lever 266 for valve V1, and the latter also having a reciprocable armature 268 suitably connected to a lever 270 for valve V2. As will be evident, the joint between levers 266, 270 and armatures 264, 268 will permit vertical movement of the latter to effect pivoting of the former to change the position of the valves. In the positions shown, pump P1 is actuated to pump the hydraulic liquid through valve V1 and line 166 into chamber 162 to project pin 100′ into locking position. As piston 164 is moved to the left, the liquid forced back through line 168 will pass through valve V2, vent line 258 and back to the reservoir R.

A power line 272 is connected to solenoid 260 and pump P1 by lead wires 274, 276 respectively. On-off switches 278, 180 are provided for these wires, as shown, with a common actuator 282 connected to the switches for simultaneous actuation thereof.

Lead wires 284, 286 respectively connect solenoid 262 and pump P2 to the power line 272, with switches 288, 290 being provided for these wires, as shown. A common actuator 292 is arranged for simultaneous actuation of these switches. The pumps and solenoids may be grounded, as indicated.

When switches 288, 290 are closed, switches 278, 280 will be opened whereby solenoid 262 and pump P2 will be energized or actuated, and solenoid 260 and pump P1 will be deenergized. Energization of solenoid 262 causes its armature to be pulled upwardly, rotating valve V2 clockwise through 90° whereby pump P2 will pump fluid through line 168 and into chamber 162 to retract the locking pin 100′. Meanwhile, valve V1 has rotated 90° clockwise as a result of deenergization of solenoid 260 and the return of armature 264 downwardly to its normal position. Line 166 now communicates through vent line 256 with the reservoir R for return flow of fluid.

Referring now to the pressure regulator 206 in the ballast tank 94′, this regulator in the exemplary embodiment thereof under consideration is of known construction and adapted to be operated for delivering the pressurized fluid at different ranges of pressures. As previously indicated, the pressurized fluid delivered to regulator 206 by branch conduit 214 may be air under a pressure of 150 p.s.i.g. And the pressure regulator will be selectively operated in a suitable manner so that the compressed air delivered thereby to lines 208, 210 will either be in the range of 10–20 p.s.i.g. or 40–60 p.s.i.g.

The normally closed air outlet valve 198 and the air-actuated hydraulic pump 188 for water inlet 184 will be designed to be respectively opened and actuated only when the pressure regulator 206 delivers air under a pressure of 10–20 p.s.i.g. through lines 208, 210; whereas the normally closed air inlet valve 202 and the air-actuated hydraulic pump 190 for the water outlet valve 186 will be respectively opened and actuated only when the pressure delivered by the regulator 206 to the lines 208, 210 is between 40–60 p.s.i.g.

Electrical leads 294, 296 are shown in FIGURES 12 and 15 as extending from the power line 272 to the pressure regulator 206 which may be grounded, as indicated, with switches 298, 300 being respectively provided in lines 294, 296. Closing the switch 298 in line 294 will be effective to operate the pressure regulator 206 so that it supplies air under a pressure of 10–20 p.s.i.g. to the lines 208, 210; while the closing of switch 300 will be effective to operate the pressure regulator 206 so that it supplies air under a pressure of 40–60 p.s.i.g. to the lines 208, 210.

Lead 302 is shown as being connected to the power line 272 and may extend to suitable means in regulator 206 for reducing the pressure in lines 208, 210 to zero when the switch 304 in this lead 302 is closed, and switches 298, 300 are opened, whereby all air and water inlets and outlets in the ballast tank will be closed, causing the water cellar to remain at a constant submerged level.

Hence, it will be apparent that in the operation of sinking the water cellar 18″, the switches 288, 290 will be closed and the switches 278, 280 opened so that the locking pin 100′ will be retracted. The switch 298 will be closed and the switches 300, 304 will be open, whereby air under a pressure of 10–20 p.s.i.g. will be supplied by the regulator 206 to the lines 208, 210 so that water will be pumped into the ballast tank by pump 188 while air will be displaced therefrom through the open air outlet valve 196. At this time, valve 202 will be closed and pump 190 deactivated to prevent flow of water from the tank through outlet 186.

After the water cellar has been guided into operative seating engagement with fitting 34″ on the drive pipe 16″, the switches 288, 290 will be opened and the switches 278, 280 will be closed whereby hydraulic fluid will be pumped through line 166 into the chamber 162 to project the pin 100′ into the wedging or locking position thereof shown in FIGURE 11. When it is decided to raise the water cellar, the switches 278, 280 are opened and the switches 288, 290 are closed to retract the locking pin 100′, after which the switch 300 will be closed, with the switches 298, 304 opened whereby the pressure regulator 206 will operate to supply air under a pressure of 40–60 p.s.i.g. to the lines 208, 210 and the air inlet valve 202 will thus be opened while the hydraulic pump 190 will be actuated to respectively introduce air from line 212 directly into the ballast tank 94′ and discharge the water from the ballast tank through the outlet 186, thus making the water cellar buoyant and causing it to rise or surface. Air outlet valve 198 will be closed and water pump 188 will be deactivated during such surfacing.

As shown in FIGURE 12, another water outlet valve 306 is provided at the left hand end of the outer diameter of the ballast tank 94′, with an air-actuated hydraulic pump 308 connected thereto. This outlet will be normally closed and the pump 308 is designed to be operated by air under a pressure of 40–60 p.s.i.g. The pump 308 is connected by a line 310 to a pendulum actuated valve 312 having a passage 314 therein connecting the two portions of line 194, and also having a passage 316 therein adapted to connect the upper or upstream portion of line 194 to the line 310 when the water cellar rises to the surface and rotates through approximately 90° in a counterclockwise direction, as viewed in FIGURE 12. This position of the water cellar is indicated in FIGURE 6. During such swinging movement of the water cellar, the pendulum 318 on the valve 312 will operate to rotate the valve so that line 210 no longer communicates with the air-actuated hydraulic pump 190 but now communicates with the air-actuated hydraulic pump 308 through line 310, whereby discharge of substantially all of the water in the ballast tank 94' will be assured. More of these water outlets 306 may be provided around the periphery of the ballast tank, as preferred, and they will be normally closed except when air pressure of 40–60 p.s.i.g., is supplied to pump 308.

The switches 298, 300, 304 and the actuators 282, 292 for the switches 278, 280, 288, 290 may all be conveniently arranged in a control panel or the like (not shown) disposed at the water surface.

If desired, an all electrical control system may be utilized for opening and closing the air inlet 202 and outlet 198 valves, for actuating the hydraulic pumps 188, 190 and 308.

Referring again to FIGURES 4, 5, and 6, it will be appreciated that the upper part of the bore in fitting 34' may be internally threaded, as indicated for fitting 34" in FIGURE 11, and the upper part of the drive pipe 16' threaded thereinto for convenient removal therefrom after the fitting 34' and lower part of pipe 16' have been driven into the marine bottom to a sufficient depth. Or, if desired, the upper part of the drive pipe and the upper part of casing 66' may be cut by a torch just above fitting 34' when the latter is in operative submerged position, as previously indicated.

Although not shown, blower means may be provided at the upper end of one of the conduits 52 for circulating air through the submerged working chamber 20 during operations.

Figure 16:
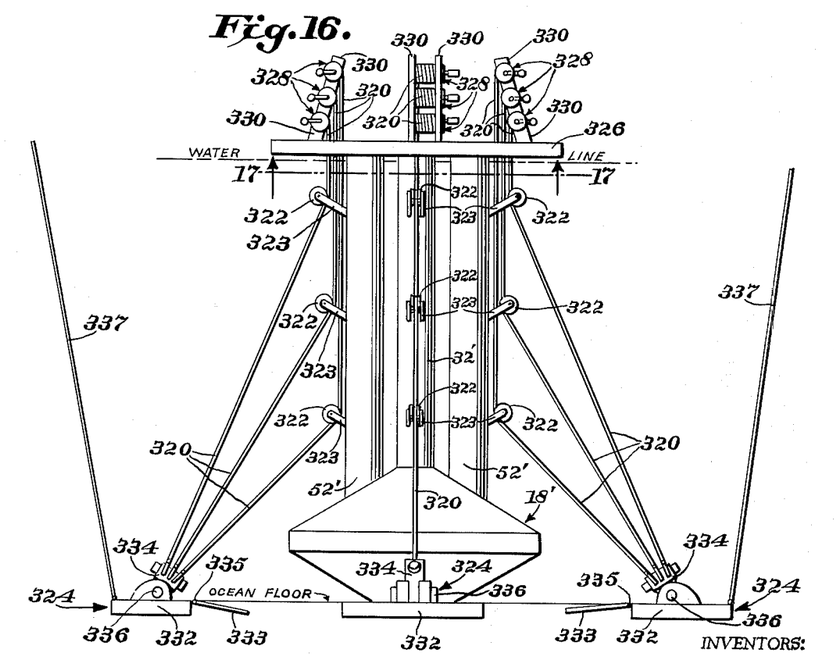
FIGURE 16 is an elevational view corresponding generally to FIGURE 8 and illustrating an exemplary construction for maintaining the conduits rising from the submerged water cellar in vertical position.
Figure 17:
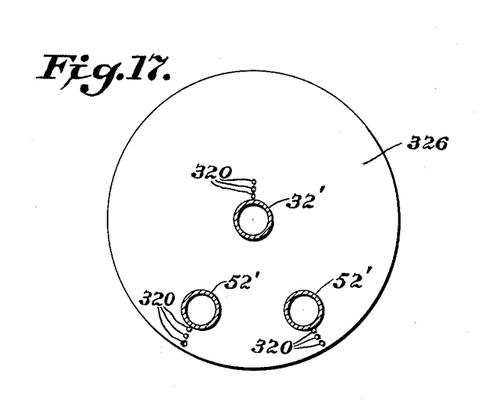
FIGURE 17 is a sectional view taken generally along line 17—17 of FIGURE 16.

FIGURES 16 and 17 illustrate an exemplary embodiment of structure that may be added to the water cellar arrangement for maintaining the conduits rising from the submerged water cellar in substantial vertical position irrespective of the submerged depth of the water cellar or the turbulence of the surrounding body of water. For illustrative purposes, this structure is shown in FIGURE 16 as being applied to the water cellar arrangement 18' of FIGURE 8, although it will be appreciated that it is applicable to other water cellar arrangements covered by the invention. The illustrative embodiment of the structure in question includes a plurality of guy lines 320 associated with the conduits 32', 52'. As shown, three of these lines are respectively engaged to three pulleys 322 mounted one above the other on each of the conduits 32', 52'. Brackets 323, attached to the conduits, are provided for mounting the pulleys, as indicated.

At their lower ends, the guy lines 320 are attached to an appropriate anchoring means 324, and they are shown as extending upwardly through a plate-like member 326 to separate winches 328. As shown, member 326 will be secured to the conduits 32', 52' without sealing off the open upper ends thereof. These winches 328 will be at the water surface and may be of any suitable construction for manual or automatic and powered operation. As shown, they are mounted by pairs of upright members 330 attached to the member 326.

The illustrated anchoring means 324 includes a base portion 332 for engagement to and in the ocean floor or marine bottom, as indicated. This base portion may be sufficiently heavy and dense to sink into the ocean floor and provide an adequate anchor for holding and allowing tightening of the guy lines 320. A flap or fluke 333 is shown pivoted to the base 332 at 335, and will be covered by mud, silt, etc. to further resist upward movement of the base 332 toward the conduits 32', 52'. An anchor line 337 of suitable construction may be attached to the rear of each base portion 332 and extend to the water surface, as shown, to facilitate lowering and elevating these anchors, as will be understood.

It will be appreciated that the particular construction of the anchors 324, shown in the drawings, is merely for illustrative purposes. Other types of anchors may be utilized as desired or preferred.

All of the anchoring means 324 could be dropped from the surface after the water cellar 18' is submerged and installed on the submerged drive pipe fitting 34'. Although all of the guy lines associated with any one of the conduits 32' or 52' are shown as being attached to a common anchoring means 324, it will be evident that a separate anchor could be used for each guy line.

As indicated above, the use of guy lines 320, as shown in FIGURE 16, is particularly advantageous if the submerged water cellar is used in a considerable depth of water, for example, a depth greater than 100 feet. During use at such depths, there may be exerted such lateral hydraulic or other forces on the conduits 32', 52' as to cause bending of these conduits. For instance, if the middle of a 300 foot column or conduit (32' or 52') is bending to the south, the guy lines at the midpoint could be tightened on the opposite sides, using the appropriate winches at the surface, until the column was straight. As is apparent, readjustment using the winches 328 could be made at any time from the water surface.

It will be understood that as many guy lines 320 will be used as are required or preferred for any particular installation or installations, and they may be of any suitable strong and durable construction, such as metallic cables.

As indicated heretofore throughout the specification, a highly important feature of the invention resides in the ability to remove the water cellar (18, 18' or 18") from the completed well, so that this cellar or chamber and its associated equipment, may be used successively on a number of wells, as same are being drilled. Anchillary to this capability, of course, is the ability to reinstall the cellar and its associated equipment, or a well which has been completed, so that any reworking or similar operations which may be required, may be performed, while keeping the well under control at all times, as will be appreciated.

This ability to remove and install the water cellar, of course, depends on the relative diameter of certain of the parts, and the openings therein. For instance, and referring to FIGURE 9, the specification has described the removal of the water cellar after the installation of the protector 128 around the Christmas tree equipment. While not emphasized in the drawings, because of their somewhat schematic nature, it will be understood that the minimum diameter of the lower opening 30' leading from the water cellar, preferably is considerably greater than the maximum exterior diameter of the protector 128, when same is installed. The result of the above will be that the water cellar may be elevated upwardly around the protector 128, without damage to the Christmas tree equipment. Similarly, in the event that any reworking of the well is required, the tapered opening at the bottom of the water cellar may be lowered down over the protector 128. It will be understood, in this connection, that the protector assembly 128 is sufficiently rugged, so that it will protect the Christmas tree equipment against any substantial impact, for example, as might occur when the water cellar is being lowered or raised over the protector. The upper end of the protector 128 is tapered, as shown, and this design will facilitate registering the tapered opening at the bottom of the water cellar with the top of the protector for proper guiding onto the tapered fitting on the drive pipe.

The relative size of the various parts is also important in connection with the use and removal of the well known items of control equipment, such as the master drilling valve and blow-out preventer, which are now successively used on many wells rather than left as a permanent part of any well structure. As described above, and with particular reference to FIGURE 8, it will be understood that in most instances operators will prefer to work with control equipment which is suitably mounted on the tubular extension (76 or 76'), above the surface of the water, and in convenient position with respect to whatever kind of derrick floor arrangement is in use, which might either be a mobile or stationary type of platform structure at the surface. However, and in some instances, the assembly may be designed so that the control equipment can be used within the water cellar, as in the design of FIGURE 12. In such instances, the control equipment may either be of such diameter that it can be removed upwardly through the conduits which extend from the water cellar to the surface, or it can be set aside and removed through the bottom opening in the water cellar after the latter has been elevated to the surface.

In summary, if the control equipment is to be utilized within the water cellar, the design may be such that the control equipment may be removed through the conduits which extend upwardly from the water cellar, or in the event that it is larger than this conduit, it may be carried from the well head in the water cellar when the latter is elevated and thereafter removed through the bottom opening in the water cellar.

While relative dimensions of equipment, with respect to openings, are important for the reasons stated above, it has not been attempted in the drawings, which are mostly schematic, to illustrate all arrangements which will accomplish the objectives stated. The various openings may be made larger, or the equipment employed may be made of smaller diameter, as may be required to accomplish the desired purposes.

As stated above, it is contemplated that the invention, as described herein, may be used in association with various well known items of equipment, and combinations of equipment, and in practicing procedures as are known in the art. For instance, the invention contemplates the use of casing hangers, and casing hanging procedures, as disclosed in Patents 2,082,413, Mueller et al., dated June 1, 1937; 2,117,444, Mueller et al., dated May 17, 1938; 2,207,469, Roye, dated July 9, 1940; 2,620,880, Mueller et al., dated December 9, 1952; and 2,624,413, Mueller et al., dated January 6, 1953. Also contemplated is the use of such hangers and associated equipment, and practices, as are disclosed in Patents 2,751,235, dated June 19, 1956, and 2,754,134, dated July 10, 1956. The invention is likewise applicable for use with tubing hangers and completion practices as disclosed in Patent 2,241,333, Smith, dated May 6, 1941, and Patent 2,150,887, Mueller et al., dated March 14, 1939. The invention is also intended for use in such practices and in association with control devices, such as back pressure valves as disclosed in Patent 2,148,327, Smith et al., dated February 21, 1939; Patent 2,162,179, Mueller, dated June 13, 1939; Patent 2,241,288, Yancey, dated May 6, 1941, and the invention contemplates insertion and removal of tubing closures as disclosed in these patents, as well as in Patent 2,358,677, Yancey, dated September 19, 1944. For the above purposes, the disclosures of these prior art patents, as specified, are included herein by reference.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

We claim:

1. An apparatus for off-shore oil well drilling operations, said apparatus comprising: a pipe driven into a marine bottom and having an open upper end submerged in a body of water; a large, non-buoyant hollow housing arrangement submerged in said body of water and mounted in water-tight relation on said pipe upper end; said housing arrangement being supported by said pipe; vertical conduit means extending upwardly from said housing arrangement to the water surface; said conduit means including at least two conduits; and endless conveyor means having a downwardly extending and upwardly extending flight, one of these flights being arranged in one of said conduits and the other flight being arranged in another of said conduits.

2. An apparatus for off-shore oil well drilling operations, said apparatus comprising: a pipe driven into a marine bottom and having an open upper end submerged in a body of water; a large hollow housing having means at its lower end defining an opening therein; said housing being non-buoyant in water and submerged in said body of water; means on the upper end of said pipe extending laterally outwardly therefrom; said first-named means and said second-named means being removably engaged together to support said non-buoyant housing in stationary position on said pipe whereby lateral or downward movement of said housing is prevented; sealing means interposed between said first-named means and said second-named means and retained in sealing engagement therewith by the tendency of said non-buoyant housing to sink in said body of water; and conduit means extending from said housing to the surface of said body of water providing access to said housing, said conduit means including a first vertical conduit coaxial with said pipe and at least two other vertical conduits of a sufficient size for passage of men therethrough; and endless conveyor means having an upwardly and downwardly extending flight, one of said flights being disposed in one of said conduits and the other of said flights being disposed in another of said conduits.

3. Apparatus of the character described comprising: a submerged pipe driven into a marine bottom; a fitting at the top of said pipe and having an outwardly and downwardly tapering outer surface and an internal bore extending completely therethrough, said bore having a substantially uniform diameter which is substantially the same as the diameter of said pipe, a submerged water cellar including a chamber for workmen and conduit means extending upwardly from said chamber to the water surface; a bottom wall for said chamber having an opening therein and an annular flange on said bottom wall and surrounding said opening therein, said flange being formed with an internal surface complementary to and in releasable engagement with said outer surface of said fitting whereby said water cellar is supported by said pipe by such engagement; well fluid tubing within said pipe; a well head assembly arranged in said chamber above said complementary surfaces and in communication with the tubing in said pipe; said assembly being in substantial coaxial alignment with said pipe and having a maximum horizontal dimension less than the minimum horizontal dimension of both the opening in said bottom wall and the internal surface of said flange whereby said water cellar may be raised over said assembly.

4. The structure defined in claim 3 wherein a protective casing encloses said well head assembly, said casing being attached to said fitting and having a maximum horizontal dimension less than the minimum horizontal dimension of both said opening in said bottom wall and the internal surface of said flange.

5. The structure defined in claim 4 wherein said fitting is provided with an eccentrically located passageway therethrough, a permanent flow line extending from the bottom of such passageway whereby well fluids may be conducted to a gathering station, and a flow line in said protective casing connecting said passageway to said well head assembly.

6. An apparatus of the character described comprising: pipe means driven into a submerged bottom and having a bore of substantially uniform diameter extending completely therethrough and having an exterior surface near the upper end thereof which is tapered downwardly and outwardly, said upper end being submerged in a body of water; a large hollow housing arrangement extending to above the surface of the water, said housing arrangement having a wall defining an opening in the bottom of said arrangement, said wall being tapered so as to be complementary to said tapered surface on said pipe means, said housing arrangement being non-buoyant in water and submerged in said body of water above said pipe means with said tapered wall removably engaging said tapered surface on said pipe means to support said housing arrangement thereon, the tendency of said submerged non-buoyant housing to sink being utilized to hold said tapered wall in releasably engaged position on said tapered surface; and sealing means retained in sealing engagement with said tapered wall and said tapered surface by the tendency of said non-buoyant housing arrangement to sink, said pipe means being provided with a passageway therethrough in addition to said bore, said passageway extending from a point above said tapered surface to a point below said surface whereby the upper end of said passageway may be connected to a flow line from a well head assembly and whereby the lower end of said passageway may be connected to a permanent flow line leading to a gathering station.

7. Off shore well apparatus comprising: a pipe driven into a submerged bottom and having its upper end below water level; a fitting secured to said pipe near the upper end thereof, said fitting having an internal bore extending completely therethrough and an exposed seating surface for receiving a removable housing, said bore being coaxial with said pipe and having a substantially uniform diameter which is substantially the same as the diameter of said pipe; a hollow submerged housing having walls defining a chamber at its lower end for workmen and extending upwardly to above the water surface, said walls also defining an opening in the bottom of said chamber, the portion of said walls forming the periphery of said opening being complementary to and in releasable watertight engagement with said exposed seating surface on said fitting whereby said housing is supported by said pipe; a well head assembly arranged in said chamber above said complementary surfaces and in communication with well fluid tubing in said pipe, said assembly being in substantial coaxial alignment with said pipe and having a maximum horizontal dimension less than the minimum horizontal dimension of the wall portions which define the periphery of said opening in the lower end of said housing whereby said housing may be raised over said assembly to leave said well head assembly projecting above the top of said pipe.

8. Apparatus as in claim 7 wherein said fitting is provided with a passageway extending completely therethrough, one end of said passageway being located in said chamber and the other end being located below said complementary surfaces, said apparatus further including a production flow line connecting said one end of said passageway with said assembly and disposed within the maximum horizontal dimension of said assembly and means at said other end of said passageway for connecting the latter to a flow line for conducting well fluid to a gathering station.

9. Apparatus as in claim 7 wherein said hollow housing includes at least two vertical conduits communicating with said chamber at their lower ends and with the atmosphere above water level, the maximum horizontal dimension of each of said conduits being substantially less than the maximum horizontal dimension of said chamber, one of said conduits being coaxial with the bore of said fitting and of sufficient size to permit passage of well head components therethrough, the other of said conduits being of sufficient size to permit passage of workmen therethrough.

10. Apparatus as in claim 7 further comprising means for controlling the buoyancy of said housing, said means including a ballast tank forming part of said housing and means for admitting and ejecting water from said ballast tank.

11. Apparatus as in claim 7 wherein said exposed seating surface of said fitting is a frusto-conical surface which is inclined outwardly and downwardly.

12. Apparatus for use in underwater drilling and well completion operations comprising: a pipe having its lower end embedded in a submerged bottom and an open upper end below water level; and a fitting fixedly sealed around the upper end of said pipe, said fitting having an internal bore extending completely therethrough and an exposed annular surface, a circumferential portion of which is inclined outwardly and downwardly to define a sealing surface for receiving a removable housing, said bore having a substantially uniform diameter which is substantially the same as the diameter of said pipe, said fitting having a passageway therethrough in addition to said bore, said passageway extending from above said sealing surface to below said sealing surface whereby well fluids may be conducted through said fitting.

13. Apparatus as in claim 12 further comprising: a well head assembly mounted above said sealing surface and in coaxial alignment with said pipe; and a flow line connecting said well head assembly with the end of said passageway which is above said sealing surface.

14. In off shore, underwater operations, the method of providing a submerged, watertight enclosure from which workmen perform manual operations on a submerged structure comprising: embedding in a submerged bottom the lower end of a pipe-like structure having an axial bore of substantially uniform inside diameter extending completely therethrough, the upper end of said pipe structure lying below the surface of the water; providing a housing having an opening in its bottom; sinking said housing in a guided path down to said pipe structure; releasably engaging the periphery of said opening with the upper end of said pipe structure at a location below the upper end of the bore of said pipe structure so as to form a chamber and so that the bore communicates with said chamber through said bottom opening and so that said housing is supported by said pipe structure against movement in a direction axial thereto; effecting a watertight seal between said housing and said pipe structure; providing access for workmen, tools and equipment between said chamber and the surface of the water; performing operations manually at the top of said pipe structure from a location within said chamber adjacent and above the top of said pipe structure; and removing said housing from the top of said pipe structure.

15. The method as defined in claim 14 wherein said releasable housing is buoyant in water and wherein the sinking and removal of said releasable housing is accomplished by decreasing and increasing, respectively, the buoyancy thereof.

16. The method as defined in claim 14 further comprising: drilling through said pipe structure and constructing an oil well therein; completing an oil well head assembly on top of said pipe structure and within said releasable chamber, said completing step including said manual operations whereby said assembly extends above said pipe structure when said releasable housing is removed.

17. The method as defined in claim 14 wherein the step of embedding said pipe structure in a submerged bottom includes the step of driving a pipe structure into the submerged bottom with its upper end extending to above the surface of the water; drilling a hole in the submerged bottom through the pipe structure; running a first string of casing through the pipe structure and removing an upper portion of the pipe structure to leave said first-named pipe structure below the surface of the water.

18. The method as defined in claim 17 further comprising: drilling through said first string of casing; running a second string of casing through said first string; and thereafter completing a well head assembly at the top of said first-named pipe structure and within said releasable chamber, said completing step including said manual operations whereby said assembly extends above said first-named pipe structure when said releasable housing is removed.

References Cited by the Examiner
UNITED STATES PATENTS

| | | | |
|---|---|---|---|
| 272,722 | 2/83 | Loud | 175—170 |
| 1,786,109 | 12/30 | Edwards | 61—69.1 |
| 1,898,649 | 2/33 | Wheeler et al. | 166—49 X |
| 2,187,871 | 8/37 | Voorhees | 175—8 |
| 2,348,777 | 5/44 | Bessire | 114—16.7 |
| 2,512,783 | 6/50 | Tucker | 175—6 |
| 2,534,480 | 12/50 | Shannon | 175—8 |
| 2,684,575 | 7/54 | Pyror et al. | 166—66.5 |
| 2,691,272 | 10/54 | Townsend et al. | 175—8 |
| 2,783,970 | 3/57 | Gillespie | 137—344 |
| 2,808,229 | 10/57 | Bauer et al. | 175—7 |
| 2,854,215 | 9/58 | Cox et al. | 166—46 |
| 2,906,500 | 9/59 | Knapp et al. | 166—66.5 |
| 3,020,956 | 2/62 | Suderow | 166—66.5 |
| 3,096,999 | 7/63 | Ahlstone et al. | 166—66.5 |

CHARLES E. O'CONNELL, *Primary Examiner.*

BENJAMIN BENDETT, *Examiner.*